United States Patent [19]

Wallin et al.

[11] Patent Number: 4,612,198

[45] Date of Patent: Sep. 16, 1986

[54] HIGH STABILITY, HIGH FLAVOR, BREAKFAST PASTRY AND METHOD FOR PREPARING THE SAME

[75] Inventors: Glenn Wallin, Minneapolis; Diane Rosenwald, Brooklyn Park; James Citti; Samuel Yong, both of Minneapolis, all of Minn.

[73] Assignee: The Pillsbury Company, Minneapolis, Minn.

[21] Appl. No.: 355,271

[22] Filed: Mar. 5, 1982

[51] Int. Cl.$^4$ .............................................. A21D 13/08
[52] U.S. Cl. ..................................... 426/94; 426/373; 426/556; 426/439
[58] Field of Search .................. 426/19, 549, 94, 103, 426/283, 573, 578, 579, 601, 556

[56] References Cited

U.S. PATENT DOCUMENTS

| | | | |
|---|---|---|---|
| 3,142,573 | 7/1964 | Erekson et al. | 426/94 |
| 3,250,627 | 5/1966 | Thelen | 426/94 |
| 3,388,997 | 6/1968 | Schaible | 426/19 |
| 3,656,967 | 4/1972 | Barton | 426/94 |
| 3,821,452 | 6/1974 | Hayashi | 426/502 |
| 3,865,963 | 2/1975 | Gugler | 426/502 |
| 4,517,203 | 5/1985 | Levine | 426/94 |

FOREIGN PATENT DOCUMENTS 2102269  2/1983  United Kingdom ................ 426/283

OTHER PUBLICATIONS

Matz, Cookie and Cracker Technology, Avi Pub. Co. Inc., Westport, Conn., 1968, pp. 158-160.
Tressler, et al, Food Products Formulary, vol. 2, Westport, Conn., Avi Pub. Co. Inc., 1975, p. 118.

Primary Examiner—Raymond N. Jones
Assistant Examiner—Elizabeth A. King
Attorney, Agent, or Firm—Robert J. Lewis

[57] ABSTRACT

A high moisture, highly stable, breakfast pastry which comprises a dough shell surrounding an encased, flavored filling material. The pastry is suitable for cooking/frying, freezing, subsequent thawing, and toasting. For products of this type, this breakfast pastry has an unusually high moisture content, and because of the special composition and processing of both the dough shell and the interior filling, there is a unique stability at the interface of the two, which minimizes often occurring undesirable phenomena, such as moisture migration, color deterioration, dough sogginess, and flavor loss.

38 Claims, No Drawings

HIGH STABILITY, HIGH FLAVOR, BREAKFAST PASTRY AND METHOD FOR PREPARING THE SAME

BACKGROUND OF THE INVENTION

This invention relates to an improved breakfast pastry product of the type which is prepared with an interior filling, which is cooked, packaged, and frozen. The user thaws the product and toasts it, or toasts directly from the freezer. Such toaster-breakfast pastries present numerous technical problems in their preparation, storage and stability.

One of the primary problems for such toaster pastry products is the development of a product which not only has high flavor, but is also storage stable. One rather logical method of achieving high flavor is to utilize a high moisture content product with a very large quantity of interior filling and minimal surface contact. However, while this might maximize the flavor impact for the consumer, it necessarily will cause product stability problems.

For example, a larger quantity of filling means that there is a minimization of area of interface contact between the filling and the interior dough surface. The area of this surface contact, i.e., the interface, is a potential area of instability caused by numerous chemical degradation reactions. Amongst the things that may often be noted at the interface are the following: moisture migration from the filling to the dough which develops sogginess in the dough; acid migration from a fruit filling to the dough which develops a loss in pH and fruit tartness; color changes because the filling color changes with changes in acidity; dough and filling flavor loss; and, degradation of product structural integrity.

One commonly employed technique heretofore used to overcome these significant stability problems, has been to develop toaster products of very low moisture content. Decreasing the moisture content is desirable because it increases shelf life. For example, some products have been sold with as low a filling moisture content as 15% to 20% by weight, and a dough moisture content of from about 8% to about 12%. While it is true that such low moisture content products have good shelf storage, the shelf storage is achieved at the sacrifice of product taste and flavor quality. In other words, because the product is dry, it is shelf stable, but it also has a very low flavor impact and mouth feel quality.

Thus, the manufacturers of such toaster pastry products have been faced with a dilemma. Those things which make the product most desirable for the consumer, namely, flaky, crispy tender exterior crust, tender and moist interior, high percentage of filling and low percentage of filling contact with the pastry crust, as well as high moisture level, also make the product most undesirable from the standpoint of storage and stability.

It is therefore a primary objective of the present invention to provide a breakfast pastry product which is of excellent product quality, both from the standpoint of flavor and structural integrity, and yet which is uniquely stable for long periods of time.

It is another objective of the present invention to achieve the above described result with a product which has a significantly higher moisture level than other breakfast pastry products heretofore prepared by cooking, freezing, thawing, and subsequent toasting.

A still further object of this invention is to prepare a breakfast pastry product which has a very high moisture content and as well, a long shelf life stability when frozen.

An additional object of the present invention is to prepare a product which because of the dough composition and the filling composition, has substantially the same water activity level (Aw) for both the dough portion of the composition and the filling portion of the composition, thus minimizing moisture migration at the interface between the cooked dough and the filling.

Another objective of the present invention is to prepare a toaster pastry product with a fruit or acid type filling which has a controlled buffering pH system to provide acid stability to minimize acid migration which in turn controls color change and flavor loss of the filling.

An even further objective of the present invention is to provide a toaster pastry product of good structural integrity, that is to say, one which has good product seams, one which will not become soggy and break, and yet one which has a tender, flaky exterior surface and a bready interior with good cell development.

The method and manner of accomplishing each of the above objectives, as well as others, is achieved by careful control of filling viscosity and pH, and control of dough Aw and filling Aw, combined with control of dough composition and processing. A detailed description follows hereinafter.

SUMMARY OF THE INVENTION

This invention relates to an improved breakfast, toaster pastry product, of high moisture content, of good shelf stability, of high flavor and of good product integrity. These beneficial results are achieved by careful control of pastry filling viscosity and pH, and careful control of pastry dough composition and processing, all of which combine in the finished product to provide a high moisture product which at the interface of the filling and the dough has low moisture migration, low acid migration, resistance to color change and flavor loss, and which still provides a product of good structural integrity, flaky, tender exterior crust, and bready interior with good cell development and absence of visible layering.

The filling material viscosity is carefully controlled within the range of about 20,000 cps to 50,000 cps and the pH is controlled within the range of about 2.8 to about 7.5, and with respect to fruit fillings, about 2.8 to about 3.4. The preferred dough formulation is a high moisture mixed dough and roll-in shortening laminated pad, with the laminated pad having from about 3 to about 9 substantially discrete and substantially continuous shortening layers per millimeter of pad thickness, with the mixed dough portion of the pad being from about 45% to about 60% by weight of a moderately strong flour, about 30% to about 45% water by weight, and with the roll-in shortening comprising from about 4% to about 20% by weight of the laminated dough pad.

DETAILED DESCRIPTION OF THE INVENTION

The product of the present invention has been especially designed to provide a cooperative relationship and interaction between the filling of a breakfast toaster pastry and the dough formulation. Because of this interaction and the equilibrium which is set up between the two at their interface, the result is a product of unique stability, high structural integrity and high product quality.

The term "structural integrity" as used herein, refers to a product which can be easily handled and prepared by the consumer without breaking apart because of such things as weak dough seams, sogginess or the like. The term "product quality" refers to the combination of conditions which a consumer typically perceives as high quality for bakery pastries. Among those conditions are good, tender, flaky and crisp pastry surface, tender and moist interior, higher moisture level to obtain both a desirable mouth feel and a higher flavor impact, uniformity of exterior surface browning, uniformity of interior filling color, and freshness.

As heretofore mentioned, there is a unique problem with toaster products which are to be fried, frozen, packaged and shipped, as distinguished from products fresh made in a bakery and immediately sold, such as jelly donuts and bismarks. The latter type products are not concerned so much with product stability, because it is known that they will either be eaten or discarded in a very short time. In other words, they do not have to have a long shelf life. Of course, it goes without saying that long shelf life and product stability are particularly desirable for products which are in fact going to be shipped after cooking, freezing, and then subjection to a subsequent thaw and toasting.

High moisture level is desirable in such filled products, because the consumer perceives this upon tasting as part of the initial flavor impact, and also in part as a desirable mouth feel. Typically a product such as a fresh made jelly donut will employ a filling having a moisture content of from as much as 40% to 60% by weight of the filling. Heretofore, one has not been able to achieve moisture levels within this range for breakfast pastry products of the type which are to be cooked, frozen and subsequently thawed. In such products, moisture levels of the range of from about 15% to about 20% have been employed for the interior filling. It has been customary to reduce the moisture levels of such products in order to increase their shelf stability and to minimize the interaction at the interface between the interior filling and the encasing, interior dough surface. Doing so will, of course, achieve the more desirable shelf stability, but it does so only at the sacrifice of product quality.

It has now been found that the primary contributors to the problem of product stability at the interface of the dough and the interior filling have been moisture migration from the filling to the dough, and acid migration from the filling to the dough. The moisture migration causes sogginess in the dough, a change of the pastry texture and quality and increases significantly the risk of structural integrity failure. The acid migration causes several effects. It changes the taste and texture of the dough. It often changes the color of the interior filling; it often changes the color of the dough at the interface between the dough and the filling; and as the acidity decreases in the filling because of hydrogen ion migrations into the dough, the tartness and flavor impact of the filling is decreased.

It has now been found that these undesirable effects of a high moisture filling can be controlled through control of filling viscosity and filling acid stability, and if so controlled, a high filling moisture level, i.e., as high as from about 30% to about 50% by weight can be utilized, and still a stable product will be provided.

The fillings typically comprise sweeteners, water, viscosifiers, flavors and when appropriate, acidulants and their salts. A wide variety of jelly, or filling, compositions and flavors can be used in the present invention. There is no specific limitation on many of the ingredients of the filling composition, each of those being used to develop the desired sweetness-tartness combination one chooses, as well as the specific flavors, such as grape, strawberry, cinnamon, cherry, blueberry, etc. Shown in Table 1 is a typical filling formulation which might be utilized in the pastry industry.

TABLE 1

| FRUIT FILLING FORMULATION | |
|---|---|
| Ingredient | % by Weight |
| Sugar | 15–20% |
| Water | 40–70% |
| Fruit | 5–10% |
| Corn syrup | 5–10% |
| Artificial flavoring | 1–2% |
| Coloring | Less than .25% |
| Modified starches | 2–3% |
| Preservatives (potassium sorbate, sodium benzoate) | Up to 1% |
| Gum | Up to .1% |

What has been discovered, is that the significant normally occurring interactions between the filling and the dough can be minimized and brought into equilibrium such that there is good product quality and stability, providing that one carefully controls both the viscosity of the filling composition and particularly for fruit fillings, the pH, by employing a pH buffering system.

Providing that both viscosity and pH are controlled within the ranges hereinafter specified, it has been found that the filling formulation of this invention, in combination with the dough composition of this invention, will achieve a product of both high product quality and high moisture content, and yet one of good shelf stability and product stability. This is particularly so at the interface between the filling and the interior surface of the fried dough.

It is not known precisely what causes this unique interaction and the resulting high product quality and high stability. But it is known that typical prior art products such as fried fruit pies and the like, have a very short shelf life, as low as a week or so. The product of this invention can be successfully stored, frozen at least as long as three months, and at times up to six to nine months. Stability after subsequent thawing is in excess of two weeks in the refrigerator, all without any significant effect upon product stability or quality.

The viscosity of the filling utilized in combination with the dough formulation of this invention should be within the range of from about 20,000 centipoises (cps) to about 50,000 cps, preferably from about 30,000 cps to about 50,000 cps, and most preferably about 40,000 cps. For completeness, it should be mentioned that the viscosity ranges as mentioned herein are measured on a Brookfield Viscometer RVT No. 7 spindle at 50 rpm, and a temperature of 72° F.

The desired viscosity control can be accomplished by control of the starch level in the filling composition, and the gum level, with sufficient amounts being added to achieve the specified viscosity ranges. The modified starch level in conventional fillings is from about 2% to about 3% by weight, as shown in the table above. In the present invention, the modified starch level ranges from about 3.5% by weight of the filling to about 8% by weight of the filling, more preferably from about 4% by weight of the filling to about 6% and most preferably, from about 4% to about 5% by weight.

In addition to the modified starch level being higher than normal, the gum content differs considerably. Gums, such as Xanthan gum, guar gum, and locust bean gum are commonly employed in fillings, as indicated in the table. However, the level typically used is very, very low, being 0.1% by weight or less. In this invention, the gum level is increased to within the range of from about 0.15% up to as high as 0.4% by weight of the filling, with a preferred range of from 0.15% by weight to about 0.25% by weight, with the most preferred level being about 0.2% by weight. The gum can be any of the typical gums used, such as those mentioned above.

As heretofore mentioned, in addition to controlling the viscosity of the filling composition, the pH is carefully controlled in acidified or fruit type fillings. In non-fruit fillings, the pH may vary over a wider range of from 2.8 to 7.5. pH control is provided in the invention formulation for fruit containing, fruit flavored, and other acidic type fillings hereinafter referred to as acidic fillings, to provide a pH within the range of from about 2.8 to about 3.4, most preferably within the range of from about 3.0 to about 3.1. These are fairly high acidity levels, resulting in a high titratable acid level when compared with conventional fillings. For example, the titratable acidity of the fruit fillings of this invention is within the range of from 0.5% to about 2% titratable acid, as citric acid.

The pH and titratable acidity of the acidic fillings are controlled within the ranges previously mentioned in order to assure that when hydrogen ions migrate into the dough, there is a sufficiently high level of acidity left to maintain both tartness and product color. Also, the employment of a buffering system, as described below, does maintain some of the hydrogen ion concentration which might otherwise decrease during cooking, and the subsequent subjection of product to freezing, storage, thawing and toasting.

In applicants' filling composition, the pH range previously specified is achieved by adding an edible acid, along with a salt of the edible acid to provide a pH buffering system. Typical edible acids which may be employed along with their typical salts, are citric acid/sodium citrate, malic acid/sodium malate, tartaric acid/sodium tartarate, and the corresponding dicarboxylic acids such as adipic acid, and succinic acid. The amount will, of course, vary depending upon the other filling composition ingredients, with the amount being whatever is necessary to achieve a pH within the ranges specified. However, generally the amount of added acid will be an amount sufficient to achieve a final titratable acidity within the broad range of from about 0.5% to about 2% by weight of the filling composition, preferably from 0.7% to about 1.5% by weight. It should be emphasized that these amounts are offered not as absolutes of edible acids/salt buffering system levels, but merely as guidelines. The important and critical features, the amount added, and the pH that is achieved. The most preferred combination because of its availability, and common use with fruit compositions, is citric acid/sodium citrate.

When both the viscosity and the pH as mentioned herein are employed, it has been found that the filling composition is particularly stable; and in spite of high moisture content, does not detract either from product quality, appearance or flavor, even during long storage conditions and even during frying, freezing and subsequent thawing and toasting. Thus, the filling composition, both because of the unique combination of physical conditions as well as its chemical composition, provides a filling of high shear resistance, high temperature resistance, good freeze-thaw resistance, and a filling of long shelf life, and of high flavor quality. Moreover, the filling composition, particularly when employed in combination with the dough composition of this invention, has the proper water activity level (Aw) to allow the filling to act as a moisture sink to absorb moisture from the dough during frying, without subsequent return of that moisture to the dough. Also, the composition does not leak at the dough shell seams during frying or subsequent toasting, even though the dough may be a docked one.

We turn now to a description of the dough composition, which is most preferably used in combination with the above described filling.

One of the objectives of this product is to achieve a pastry product which utilizes a leavened dough. Leavened doughs are desirable because the leavening provides good product volume, and aids greatly in tenderness and crispness. It is what one would expect to purchase in a bakery, and what the consumer normally expects in a high quality product. The fact that a product is to be a leavened one, increases the problems encountered in preparing a stable toaster product. Of course, an unleavened product which does not have nearly the porous cellular structure of a leavened product is generally more stable for several reasons. First, it can be highly compressed and made with a very crumbly, dried dough-like appearance; secondly, the lack of a well developed cell structure will mean that moisture migration and acid migration from the filling to the dough composition will be less; and third, the area of surface contact between the filling and the dough is minimized.

However, while there are some desirable stability factors achieved in such a compressed, dry, low moisture content dough composition, it also necessarily involves extreme sacrifices in product quality. In accordance with the present invention, the dough formulation, when used in combination with the filling previously described, provides a high moisture content dough of excellent exterior flakiness, which is tender and crisp, and has a well developed interior cell structure, like freshly purchased fried pastries.

To achieve the desirable objectives of the present invention, one should employ a moderately strong, or stronger flour hereinafter referred to as strong flour. As those skilled in the art know, the strength of a flour refers to its protein content. Such moderately strong flours are typically high in gluten content, with the flour having a flour protein content of from about 10% to about 15% by weight of flour, preferably from about 11% to about 13% by weight of flour, and most preferably from about 12% to about 12.8% by weight of flour. Such flours can be bleached flours, and usually are.

The dough formulation typically comprises a mixed dough of flour, water, leavening, dough shortening, and optionally, sugars, salt, dough conditioners, flavors and emulsifiers, which is combined with roll-in shortening to form a laminated dough pad. The laminated dough pad comprises alternating substantially discrete and continuous layers of mixed dough and roll-in shortening.

The mixed dough formulation of this invention, is a leavened dough. It can be yeast leavened or chemical leavened or a combination of the two. The yeast, which may be typical baker's dry yeast, is added at a level of from 0.5% by weight to about 4% by weight of dough, preferably from about 1% by weight to about 3% by weight of dough, and most preferably about 1.2% by weight to about 1.8% by weight of the mixed dough formulation. The mixed dough formulation also has some added dough shortening, to be distinguished from hereinafter described roll-in shortening, with the amount ranging from about 0.5% to about 10% by weight of the mixed dough mix, preferably from about 1% to about 5% by weight, and most preferably from about 2% to about 3% by weight.

The dry ingredients of the mixed dough formulation are added to water, with the flour and water content within the ranges from about 45% to about 60% by weight flour and from about 30% to about 45% by weight water. The most preferred flour and water content in the mixed dough formulation are from about 54% to about 55% by weight high protein flour and a water level from about 34% to 36% by weight.

It has been found important to this invention that the mixed dough flour be a high protein flour as hereinbefore described, and that the flour to water ratio be within the range as just described. It is important that these levels are employed in the mixed dough composition in order to achieve the desired rheological properties, once roll-in shortening is added.

The mixed dough composition also has added sugars, salts, and a certain low level of emulsifying agent. The amount of sugar added may range from 0% to 10% by weight of dough mix, depending upon the sweetness desired, with from about 1% to about 5% being typical, and most preferably for this invention, at about 1.75%. As those skilled in the art know, the sugar level controls the sweetness and as well, has some effect upon the controlled browning during cooking and toasting.

The salt level may be within the range of from about 0.5% to about 1.5% by weight in the mixed dough composition, preferably from about 1% to about 1.2% by weight. Emulsifying agents, such as mono- and di-glyceride emulsifiers well known to those in the art, may be used at the level of from about 0% to about 5% by weight of dough mix with from about 0.1% to about 3.3% by weight being preferred, with the most typical and most preferred level for this invention being at about 0.1%.

In accordance with the preparation of the mixed dough composition, the flours, sugars, salt, dough conditioners, chemical leavening agents, eggs, shortening and flavorings heretofore described are dry mixed prior to the addition of water and yeast. After dry mixing the water and yeast are added, and the ingredients are then fully mixed, at a controlled temperature, in order to prevent premature proofing. Typically such a mixer can be one which has a cooling jacket to assure that the temperature is low enough to prevent premature proofing.

During this initial mixing, the dough temperature should not exceed about 66° F. as higher temperatures will result in poor sheeting characteristics and may result in premature proofing. Typically, mixing may be from about three to about 30 minutes, preferably from about four to about ten minutes.

One of the special features of this invention, particularly for its preferred aspect, is that the dough shell casing for the ultimate prepared product is a laminated dough pad, that is to say, it involves laminations of mixed dough and roll-in shortening.

After the mixed dough formulation hereinbefore described has been prepared, it is then employed with a hydrated or anhydrous roll-in shortening, with the amount of roll-in shortening utilized being from about 4% to about 20% by weight of the total laminated dough pad composition after roll-in has occurred, preferably from about 6% to about 9% by weight, and most preferably from about 6.5% to 7.5% by weight.

The precise roll-in shortening employed in the roll-in shortening step is not critical. It may be any of the conventional hydrogenated vegetable oil shortenings available on the market, commonly employed in the baking industry. Those are plastic or hydrogenated glyceride shortenings derived most commonly from vegetable oils by hydrogenation. The common oils are cottonseed oil, soybean oil, coconut oil, rapeseed oil, peanut oil, olive oil, palm oil, sunflower seed oil and the like.

A highly important aspect of this invention is that the laminated dough pad, utilizing roll-in shortening at the level hereinbefore described, has from about three to about nine substantially discrete and substantially continuous shortening layers per millimeter of laminated dough pad thickness. The layers should be substantially discrete and continuous, in other words, should be substantially non-broken and should extend along the full length of the laminated dough pad. It has been found that when the roll-in shortening level is used at the level hereinbefore described, providing that the layers of roll-in shortening in the laminated dough pad are substantially discrete and continuous, one can achieve the desired effects of the present invention.

Rolling in of the shortening is accomplished in known and available machinery during a sheeting step. Such typical machines may be a Rondo sheeter as well as others. In order to achieve the desired results of this invention, not only should there be both substantially discrete and continuous shortening layers, but it has been found most desirable if there are from about three to about nine substantially discrete and continuous layers of shortening per millimeter of dough pad thickness. Most preferably, the whole laminated dough pad has a thickness of about two millimeters.

When a laminated dough pad such as that described herein is utilized, in combination with the mixed dough formulation herein described, and the filling hereinbefore described, the result will be a product of high quality, high structural integrity, and generally degradation resistant during subsequent frying, freezing, thawing, refrigeration and toasting.

It is preferred that the laminated dough pad have a thickness not exceeding about two millimeters, because it has been found that such a pad is dimensioned such that after expansion during cooking, it will still easily fit within a toaster; and after expansion during toasting, it can still easily be removed from a toaster without becoming stuck.

It has heretofore been mentioned that there should be both substantially discrete and continuous shortening layers. If the layers are broken or are not discrete, it has been found that the product stability is decreased with moisture migration occurring more and the product having a tendency to be somewhat more soggy. It has also been found that this product reduces migration of moisture from filling to dough compared to conventional non-laminated doughs such as used for donuts and bismarks. Also, the laminated dough pad is excellent from the standpoint of being delamination resistant on its exterior surface, and at the same time developing a well-developed bready interior cell structure which is stable at its most interior surface with respect to the area of contact with the filling.

The preferred moisture content of the mixed dough is from about 34% to about 36% by weight, meaning a high moisture dough which leads to good fried dough quality.

After the laminated dough pad, as previously described, is made up, the product is next ready for addition of the filling and folding of the laminated dough pad to form the encasing shell. This operation is referred to as "make up". The make up operation may vary from manufacturing line to line, but generally it first involves dedusting the laminated dough pad. This is simply brushing off of excess flour on the laminated pad, in order to reduce or eliminate interaction between the filling and the loose flour at the pad surface. Dedusting can be accomplished by rotating brush dedusters. After dedusting, the laminated dough pad may be docked, followed by slitting to its desired width, and deposition, such as volumetric deposition, of the filling hereinbefore described. Preferably the filling should be about 70° F. when deposited. One may employ a water icking application along the edges of the sheet such that in the following described folding and crimping operation, good effective sealing and seam integrity are achieved.

The folders and crimpers used in the baking industry are well known. With respect to the product of the type described herein, the laminated dough pad is simply folded upon itself, laying down the top dough layer after depositing of the filling has occurred, on the bottom layer. Folding can be accomplished by dough plows. Thereafter, the free edges of the product are crimped, and preferably crimped on all sides including the folded edge in order to obtain a visually symmetrical product. After crimping, there now exists a laminated dough pad of the type previously herein described, having from three to nine discrete and continuous layers, which completely surrounds the filling. During these basic steps of make up, there are certain things which have been found important. First, during the formation of the laminated dough pad, it has been found desirable to reduce the laminated dough pad thickness for each pass through the rollers less than a 50% reduction in laminated dough pad thickness. If one attempts to achieve a greater than 50% reduction in laminated dough pad thickness per pass, it has been found that one will not be as likely to achieve the desirable discrete and continuous layers in the laminated dough pad. Also, the dedusting technique previously described is important to remove excess flour which might cling to the laminated dough pad and interact with the filling at the interior surface.

Proofing is, of course, known and need not be described in detail herein. However, for the product prepared in accordance with this invention, it has been found desirable that proofing occur from about 20 to about 40 minutes, most preferably from about 20 to about 30 minutes, at environmental temperatures within the range of from 105° F. to 110° F. and at a relative humidity of from about 66% to about 70%. During proofing the product will expand in volume as much as 80%, with the laminated dough pad itself expanding in volume as much as 100%. After proofing, the product is now ready for cooking, such as by frying.

The product during cooking should involve some constraint, to assure quality and to assure that it will not expand to a thickness beyond which it will no longer fit within a toaster. Thus, the cooking which is accomplished herein is a double restraint cooker. In other words, the breakfast pastry is restrained as it passes into the cooker by a lower conveyor screen upon which it rests and is also at least partially constrained by an upper conveyor screen on top. The screens are positioned such that the product during cooking will not achieve a thickness greater than from about 15 to about 24 millimeters. In actual operation, in the applicants' process as practiced, during the first portion of cooking, the product is riding wholly on the lower conveying screen without any upper constraint. Thereafter, as cooking time increases as the product moves through the fryer, there does become constraint with respect to both the upper conveying screen as well as the lower conveying screen.

Cooking conditions are such to achieve a crisp surface and moist but not gummy interior. Typically, this can be achieved by frying at about 350° F. to 425° F. from 25 seconds to 180 seconds, but preferably from about 360° F. to about 380° F. and from about 40 to 50 seconds, typically from 370° F. to 380° F. from 43 to 37 seconds. Numerous frying oils may be used, but one which has been found especially preferable for frying of the product of this invention is Durkee's Durkex 100.

Immediately after cooking, as the product exits from the cooker, the gap between the constraining conveying screens is somewhat decreased to provide a post-cooking thickness of from about 15 to about 20 millimeters. Such a size is especially suitable for placing in a conventional toaster. The product is now ready for freezing and packaging.

The heretofore presented description has been with regard to the most important use of laminated dough pads for preparation of the product of this invention. However, it should also be mentioned that it may be possible for one skilled in the art to utilize the dough formulation hereinbefore described having the requisite shortening level, all in combination with the required filling composition of this invention, with a dough shell prepared from blitzed dough. However, it is strongly recommended that one employ the lamination technique, for best results.

When the product is prepared as previously described herein, it has been found during use, storage and stability testing, that the product does not exhibit any undesirable characteristics typical of product degradation at the interface of the filling and the interior dough surface. In particular, even though high moisture is present in the filling, there is no moisture migration of any significance; there is no color degradation of the filling; there is no sogginess in the interior fried dough composition; and the exterior surface of the composition remains flaky, tender and crisp. It thus exhibits all of those traditional characteristics people normally like in fried or baked pastries. Importantly structural integrity is also preserved, with very little filling leakage ever exhibited. Then too, the product is delamination resistant during subsequent toasting, and is of the proper thickness and dimensions such that it will easily fit within the toaster.

Storage tests have shown that the product can be stored for periods up to as long as six to nine months in the freezer without any product degradation, and even after such long storage, can be thawed and kept in a refrigerator for up to two weeks.

Thus, it can be seen that the product accomplishes at least all of the objectives heretofore stated for the invention.

The following example serves to illustrate, but not limit the product and the process of this invention.

EXAMPLE

A typical fruit flavored filling composition of the following formulation is prepared:

| Ingredient | Amount on a percent by weight |
| --- | --- |
| Sugar | 42 |
| Water | 21 |
| Fruit puree' | 20 |
| Corn syrup | 10 |
| Modified starch | 5 |
| Preservatives | .1 |
| Gum | .2 |
| Citric Acid/Sodium Citrate | 1.2/.5 |

The pH of this filling composition was measured and found to be 3.1. Titratable acidity measured as citric acid was 1%. The viscosity of the filling composition was 40,000 cps. Starch addition level was 5%, and the amount of Xanthan gum added was 2%.

The viscosity was measured on a Brookfield Viscometer, RVT No. 7 spindle, at 50 rpm at a temperature of 72° F.

A high moisture mixed dough and laminated dough pad were prepared in the following manner. The flour used was a moderately strong flour having a protein content of 12.5%. The flour itself was blended in a double stained blender for two minutes, after which dough shortening, sugar and salt were added and additional dry blending occurred. Thereafter, water and hydrated yeast were added and mixing continued to provide an initial mixed dough having a water content of 54.5%. The total composition of the mixed dough, including all minor additives is as follows:

| Ingredient | Percent by Weight |
| --- | --- |
| Flour, hard wheat enriched | 52.51 |
| Ingredient water - potable | 35.51 |
| Vegetable shortening hydrogenated | 2.50 |
| Flour, unbleached soft wheat | 2.10 |
| Sucrose granulated | 1.75 |
| Whole egg solids salmonella free | 1.70 |
| Active dry yeast | 1.50 |
| Salt, medium fine (unfilled) | 1.04 |
| Dextrose (coarse) | 0.50 |
| Butter flavor emulsion, (Natural and artificial) | 0.25 |
| SAAP (sodium acid pyrophosphate) | 0.25 |
| Bicarbonate of Soda powdered | 0.25 |
| Mono- and Diglycerides (all vegetable) | 0.10 |
| Yellow color | 0.04 |

After the mixed dough composition was prepared, a dough pad was made involving discrete and continuous lamination of shortening and the above described mixed dough composition to provide a laminated dough pad having six shortening layers per millimeter of laminated dough pad thickness. In this specific instance, the total thickness of the laminated dough pad layer was about two millimeters. The amount of roll-in shortening employed in terms of percent by weight of the laminated dough pad preparation, was 7.5%. The roll-in shortening employed was a hydrated, hydrogenated vegetable shortening. The shortening and the mixed dough composition were fed into a Rondo sheeter belt.

Specifically 20 pounds of the mixed dough were transferred to lightly floured dusted Rondo belt, with dusting flour applied to its top surface. The mixed dough itself was sheeted and three-folded upon itself to form a continuous pad. Thereafter, a shortening sheet of the type earlier described was prepared having a width of 8½ inches and a length of 18 inches. The shortening sheet weighed approximately 340 grams. The shortening was rolled-in by conventional techniques and the ultimate laminated dough pad having six continuous and discrete layers was sheeted down to a thickness of two millimeters. Thereafter, the laminated dough pad having the rolled-in discrete and continuous shortening layers as described was fed to a make up table. At the make up table, the surface flour on the laminated dough pad was removed by dedusters which are two rotating brush dedusters that move over the top surface. The laminated dough pad is docked and thereafter (the laminated dough pad is 20 inches wide), is slit into three sections of uniform width.

The filling, which comprises 21.7% of the product, is applied in three rows by spot deposition by a piston filler, with the width of the spot deposit being about 1¾ inches, and the length of the spot deposit being about 3⅞ inches. The weight of the deposit is about 13 grams. The temperature of the filling is about 70° F. A water wick next applies a fine water ribbon at each edge of the slit laminated dough pad to assure proper dough-to-dough crimping. The wick is approximately one-half inch wide.

Thereafter, the laminated dough pad is passed into a static plow which is used to fold the laminated dough pad down the middle. The half section of the laminated dough pad with the filling stays on the belt, while the other half rides up the plow and folds over and lays down over the filling. Thereafter, a longitudinal crimper crimps all sides of the product to provide a product of uniform visual appearance. The width of the product after crimping is three inches.

The product is next transferred to a proofer, where it is held for 25 minutes, at a relative humidity of 68% and a temperature of 110° F.

Next, the product is moved into a large fryer containing Durkee's Durex 100 at a temperature of 375° F. The product is conveyed through the hot frying fat by two double constraint screens, one over the top and one upon which the products rests. For the first one-quarter of its travel through the double constraint fryer, the product rests solely on the bottom screen without touching the top screen. Thereafter, the top screen comes in contact with the product as it begins to fry and restrains it such that the frying thickness is about 15–24 millimeters. The belts are reduced somewhat for a reduction in thickness at the far edge of the fryer, such that post-frying the product has a thickness of from 15–20 millimeters.

After frying, the product is now ready for freezing, packaging and shipment.

Subsequent testing on the product has revealed superior stability, good structural integrity, no seam leakage, attractive appearance, flaky exterior, minimum interaction at the interior interface between the filling and dough, and overall high product integrity and quality.

It therefore can be seen that the invention accomplishes at least all of the objectives heretofore stated.

What is claimed is:

1. A high moisture, shelf stable and product stable filling, especially for toaster breakfast pastries, comprising:
   a flavored pastry filling material having a viscosity of from about 20,000 cps to about 50,000 cps,
   a starch content from about 3.5% by weight to about 8% by weight,
   a gum content from about 0.15% by weight to about 0.4% by weight,
   a pH from about 2.8 to about 7.5; and
   a total moisture content from about 30% to about 50% by weight.

2. The filling of claim 1 wherein said viscosity of said filling is from about 30,000 cps to about 50,000 cps.

3. The filling of claim 2 wherein said viscosity is about 40,000 cps.

4. The filling of claim 1 wherein said starch level is from about 4% to about 6% by weight.

5. The filling of claim 1 wherein the starch level is from about 4% to about 5% by weight.

6. The filling of claim 1 wherein said gum content is from about 0.15% to about 0.25% by weight.

7. The filling of claim 1 wherein said filling is an acidic filling, and the pH of said filling is from about 2.8 to about 3.4.

8. The filling of claim 1 wherein said filling includes an edible acid/salt buffering system present in an amount sufficient to control pH.

9. The filling of claim 8 wherein said buffering system includes citric acid/sodium citrate.

10. The filling of claim 9 wherein the buffering system has a titratable acidity from about 0.5% by weight to about 2% by weight.

11. A breakfast pastry of high moisture, excellent shelf life and product stability, high flavor impact and which is resistant to deterioration at the interface of cooked dough and filling, comprising:
    a cooked dough shell encasing an interior filling,
    said cooked dough having a flaky exterior surface, and at the same time a bready well developed interior cell structure which is uniquely stable at its most interior surface with respect to its area of contact with said interior filling,
    said filling comprising a pastry filling having a viscosity from about 20,000 cps to about 50,000 cps, a starch content from about 3.5% to about 8% by weight, a gum content from about 0.1% to about 0.4% by weight, a pH from about 2.8 to about 7.5, and a total moisture content from about 30% to about 50% by weight.

12. The breakfast pastry of claim 11 wherein said cooked dough shell is prepared from a blitzed dough.

13. The breakfast pastry of claim 11 wherein said cooked dough is prepared from a dough and laminated with roll in shortening to form a laminated dough pad having from about 3 to about 9 substantially discrete and substantially continuous roll in shortening layers per millimeter of laminated dough pad thickness.

14. The breakfast pastry of claim 13 wherein said laminated dough pad is about 2 millimeters in thickness, or less.

15. The breakfast pastry of claim 11 wherein said cooked dough shell is a fried dough shell.

16. The breakfast pastry of claim 11 wherein the cooked dough shell is prepared from a high moisture laminated dough pad comprising:
    a laminated dough and roll in shortening pad having from about 3 to about 9 substantially discrete and continuous roll-in shortening layers per millimeter of pad thickness,
    said dough being from about 45% to about 60% by weight of flour and from about 30% to about 45% by weight water,
    said roll in shortening comprising from about 4% to about 20% by weight of said laminated dough pad, and the overall thickness of said laminated dough pad being such that it will, after cooking, freezing and thawing, easily fit within a toaster.

17. A method of making a cooked dough pad, which when fried, stored refrigerated or frozen and later reheated, will provide a flaky, delamination resistant exterior surface, and at the same time a bready, well developed interior cell structure, said method comprising: (a) forming dough and laminating said dough and roll in shortening forming a laminated dough pad having from about 3 to about 9 substantially discrete and continuous roll-in shortening layers per millimeter of pad thickness, said dough containing flour in the range of from about 45% to about 60% by weight of dough and water in the range of from about 30% to about 45% by weight of dough, said pad including roll in shortening in the range of about 4% to about 20% by weight of said pad, and the overall thickness of said pad being such that it will, after frying, easily fit within a toaster, (b) frying said pad, (c) storing said fried pad in a refrigerated or frozen condition and thereafter (d) reheating said pad.

18. The method of claim 17 wherein the thickness of said pad, prior to frying, is about two millimeters, or less.

19. The method of claim 18 wherein said pad, includes filling folded between two layers of pad and after frying has a total thickness of about 15 to about 20 millimeters.

20. The method of claim 18 wherein the water content of said dough is from about 34% to about 36% by weight of dough.

21. The method of claim 17 wherein the amount of roll in shortening is from about 6% to about 9% by weight of said pad.

22. The method of claim 21 wherein the amount of roll in shortening is from about 7% to about 8% by weight of said pad.

23. The method of claim 17 wherein said dough includes shortening in the range of from about 0.5% to about 10% by weight of dough and said pad has a total shortening content in the range of between about 4.5% and about 22% by weight of pad.

24. The method of claim 23 wherein said dough includes shortening in the range of from about 1% to about 5% by weight of dough and said pad has a total shortening content in the range of between about 6% and about 17% by weight of pad.

25. The method of claim 24 wherein said dough includes about 2% of dough shortening by weight of dough.

26. The method of claim 17 wherein said dough, additionally, has a dried baker's yeast content of from about 0.5% to about 4% by weight of said dough.

27. The method of claim 26 wherein said dry yeast content is from about 1% to about 3% by weight of said dough.

28. The method of claim 27 wherein the dry yeast content is from about 1.2% to about 1.8% by weight of said dough.

29. The method of claim 17 wherein said dough has a total sugar content of up to about 10% by weight of said dough.

30. The method of claim 29 wherein said dough has a total sugar content of about 1% to about 5% by weight of dough.

31. The method of claim 30 wherein the dough has a total sugar content of about 1.75% by weight of dough.

32. The method of claim 19 wherein said dough has a salt content of 0.5% to about 1.5% by weight of said dough.

33. The method of claim 32 wherein said dough has a salt content of from about 1% to about 1.2% by weight of dough.

34. The method of claim 17 wherein said dough has an added mono/diglyceride emulsifying agent at the level of about 0.1% to about 0.5% by weight of dough.

35. The method of claim 34 wherein said dough has an emulsifier level of about 0.1% to about 0.3% by weight of dough.

36. The method of claim 17 wherein said reheating is done in a toaster.

37. The method of claim 17 wherein said storing is done at least partially under frozen conditions.

38. The method of claim 17 wherein the laminated dough is proofed prior to frying.

* * * * *

UNITED STATES PATENT AND TRADEMARK OFFICE
CERTIFICATE OF CORRECTION

PATENT NO. : 4,612,198

DATED : September 16, 1986

INVENTOR(S) : Glenn Wallin et al.

It is certified that error appears in the above-identified patent and that said Letters Patent is hereby corrected as shown below:

Column 13, lines 54 and 55, "0.1% to about 0.4%" should read -- 0.15% to about 0.4% --.

Signed and Sealed this

Twenty-fourth Day of March, 1987

Attest:

DONALD J. QUIGG

*Attesting Officer*     *Commissioner of Patents and Trademarks*